W. McQ. LANDRETH.
CHURN-DASHER.
No. 189,631. Patented April 17, 1877.
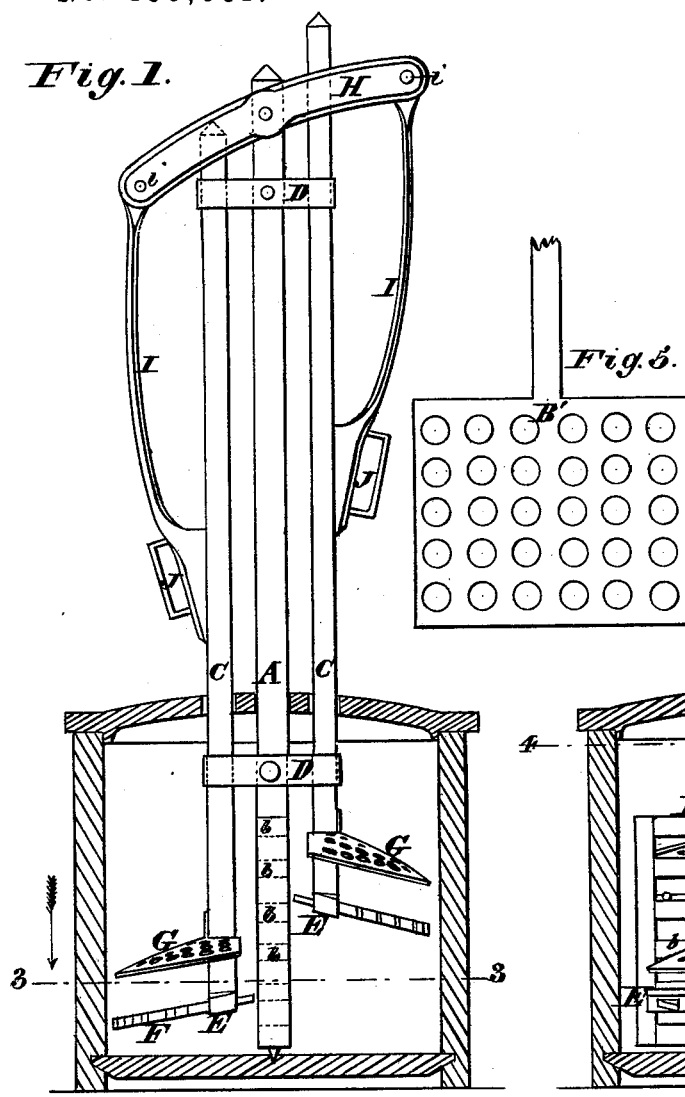
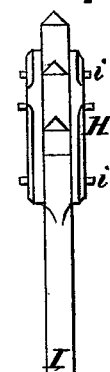
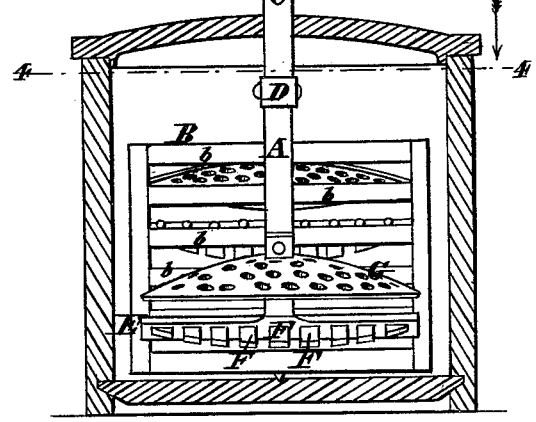
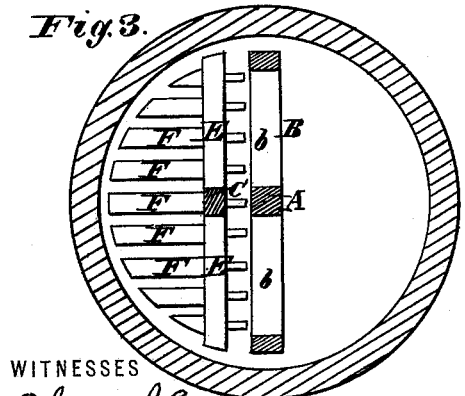

UNITED STATES PATENT OFFICE.

WILKINSON McQ. LANDRETH, OF JOHNSON CITY, TENNESSEE.

IMPROVEMENT IN CHURN-DASHERS.

Specification forming part of Letters Patent No. 189,631, dated April 17, 1877; application filed October 10, 1876.

*To all whom it may concern:*

Be it known that I, WILKINSON MCQUEEN LANDRETH, of Johnson City, in the county of Washington and State of Tennessee, have invented a new and useful Improvement in Churns, which improvement is fully set forth in the following specification:

The object of my invention is to thoroughly separate and rapidly form or gather the butter from milk or cream, and with a less amount of labor than with other machines for churning by hand.

The principle of my invention consists in agitating the milk or cream thoroughly by mechanism which will produce the sharp friction necessary to break the fat globules, and will introduce and combine the gases of which atmospheric air is composed with the cream or milk, thus hastening the process of churning or making butter.

To this end I construct my churn with a pair of alternating dashers operating on opposite sides of a vertical partition, which may be perforated, slotted, or imperforate, as preferred. Each of the dashers consists of a base formed of wooden slats, surmounted by a perforated concave plate, and attached to vertical sliding rods, which vertical rods are connected by elastic or pivoted rods to the respective ends of a pivoted beam.

In the accompanying drawings, Figure 1 is a side elevation of the churning mechanism, showing the churn or containing-vessel in section. Fig. 2 is a front elevation of the same. Fig. 3 is a horizontal section on the line 3 3, Fig. 1. Fig. 4 is a horizontal section on the line 4 4, Fig. 2. Fig. 5 is a front elevation, showing a modified form of partition.

To the lower end of a center or fixed shaft, A, is attached a partition, B, formed of small square bars $b$, set in a horizontal position about an inch and a half apart, or the partition is, if preferred, formed of two boards, B', one on each side of the center staff, bored full of holes one inch in diameter, as illustrated in Fig. 5, or this partition may be formed of a solid board on each side of the center staff without holes. This partition is made of suitable height in proportion to the churn or vessel used, so that the partition will be about three-fourths of the depth of the inside of the vessel, and of a width nearly the diameter of the churn inside, thus separating it in two sections. Two rods, C C, are placed one on each side of the partition about an inch from the main staff A. These rods move through guides D placed at top, and near the lower end of the center staff A. To the lower end of these rods is attached a bar, E, of suitable size and length in a horizontal position. Through this bar are a number of small square bars, F, so placed that about two-thirds of the space on either side of the partition within the churn is open—that is, the dasher is so made that it takes up about one-third of the space. This dasher is formed so that it can be used in a round, square, or octagon churn. This dasher is placed in an inclined position, say about twenty or thirty degrees. Above this dasher, say from three to six inches, according to the height of the vessel used, is placed a second dasher, G, of tin or other metal, made concave in form to suit a square, round, or octagon churn. This is made full of square, round, or diamond holes, so that three-fourths of the surface of the dasher shall be open. This dasher is set in an inclined position to the lower one, or instead of a tin dasher a second wood dasher, like the lower one, may be used, except that the pins or bars in the upper one shall be directly above the space of the lower one. These dashers are made to operate with an up-and-down motion alternately, by means of a lever or beam, H, of suitable length placed at the top of the center staff. To the ends of this lever, by means of pins $i$, are attached elastic rods I, one end being fastened to the dasher-rods, thus connecting the rods, so as to give an alternating motion. Instead of making the rods I elastic they may be pivoted to the dasher-rods C.

At a suitable height on the dasher-rods are placed handles J, to operate the machine. The lid used for the churn is made in two sections, so formed that the center staff shall be confined tight. The dasher-rods have a space around them of about an eighth of an inch. There is a small hole in one-half of the lid to allow air to go into the churn. These dashers are placed in an inclined position, so as to partly force the milk or cream through or against the partitions at the same time it is forced through the dashers, so as to produce the greatest amount of the sharp friction which is necessary to burst the fat globules and liberate the butter.

Having thus described my invention, the following is what I claim as new, and desire to secure by Letters Patent:

The dashers E F G, vertically-sliding rods C C, having guides D D, connecting-rods I I, and beam H, constructed, combined, and operated substantially as and for the purpose set forth.

WILKINSON McQ. LANDRETH.

Witnesses:
  G. W. HICKEY,
  P. G. RUNGE.